US010249268B2

(12) United States Patent
Braun et al.

(10) Patent No.: US 10,249,268 B2
(45) Date of Patent: *Apr. 2, 2019

(54) ORIENTATION OF VIDEO BASED ON THE ORIENTATION OF A DISPLAY

(71) Applicant: Google LLC, Mountain View, CA (US)

(72) Inventors: Max Braun, Mountain View, CA (US); Casey Kwok Ching Ho, Mountain View, CA (US); Indika Charles Mendis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/584,340

(22) Filed: May 2, 2017

(65) Prior Publication Data

US 2017/0236495 A1  Aug. 17, 2017

Related U.S. Application Data

(63) Continuation of application No. 13/420,253, filed on Mar. 14, 2012, now Pat. No. 9,691,241.

(51) Int. Cl.
| G09G 5/38 | (2006.01) |
| G06T 3/60 | (2006.01) |
| G08B 13/196 | (2006.01) |
| H04N 21/414 | (2011.01) |
| H04N 21/422 | (2011.01) |
| H04N 21/4223 | (2011.01) |
| H04N 21/63 | (2011.01) |
| H04N 7/18 | (2006.01) |

(Continued)

(52) U.S. Cl.
CPC ............... *G09G 5/38* (2013.01); *G06T 3/60* (2013.01); *G08B 13/19621* (2013.01); *H04N 21/41407* (2013.01); *H04N 21/422* (2013.01); *H04N 21/4223* (2013.01); *H04N 21/632* (2013.01); *G06F 2200/1637* (2013.01); *H04N 7/185* (2013.01); *H04N 21/4126* (2013.01); *H04N 21/4314* (2013.01)

(58) Field of Classification Search
None
See application file for complete search history.

(56) References Cited

U.S. PATENT DOCUMENTS

| 5,734,421 A | 3/1998 | Maguire, Jr. |
| 7,683,937 B1 | 3/2010 | Blumenfeld |
| 7,920,165 B2 | 4/2011 | Adderton |

(Continued)

*Primary Examiner* — Mohammad J Rahman
(74) *Attorney, Agent, or Firm* — McDonnell Boehnen Hulbert & Berghoff LLP

(57) ABSTRACT

Methods and systems involving the orienting of video data based on the orientation of a display are described herein. An example system may be configured to (1) receive first video data, the first video data corresponding to a first orientation of the image-capture device; (2) send the first video data to a second computing device; (3) receive, from the second computing device, first orientation data indicating a requested orientation of the image-capture device; (4) cause a visual depiction of the requested orientation to be displayed on a graphical display; (5) receive second video data, the second video data corresponding to a second orientation of the image-capture device, where the second orientation is closer to the requested orientation than is the first orientation; and (6) send the second video data to the second computing device.

20 Claims, 15 Drawing Sheets

(51) Int. Cl.
   *H04N 21/41*     (2011.01)
   *H04N 21/431*    (2011.01)

(56) References Cited

U.S. PATENT DOCUMENTS

| | | |
|---|---|---|
| 8,799,810 B1 | 8/2014 | Wheeler |
| 9,773,022 B2 * | 9/2017 | Kontkanen ............ G06T 15/00 |
| 2002/0196202 A1 | 12/2002 | Bastian |
| 2004/0104935 A1 | 6/2004 | Williamson et al. |
| 2006/0241792 A1 | 10/2006 | Pretlove |
| 2007/0002037 A1 | 1/2007 | Kuroki |
| 2008/0005702 A1 | 1/2008 | Skourup |
| 2010/0245585 A1 | 9/2010 | Fisher et al. |
| 2010/0259619 A1 | 10/2010 | Nicholson |
| 2011/0205243 A1 | 8/2011 | Matsuda |
| 2011/0249122 A1 | 10/2011 | Tricoukes et al. |
| 2013/0095855 A1 * | 4/2013 | Bort ...................... G06T 17/05 |
| | | 455/456.2 |
| 2013/0128364 A1 | 5/2013 | Wheeler |
| 2013/0139082 A1 | 5/2013 | Wheeler |
| 2013/0187834 A1 | 6/2013 | Nohara |
| 2014/0085339 A1 * | 3/2014 | Brady ...................... G06T 3/60 |
| | | 345/649 |

* cited by examiner

Time 1

Time 1

Time 2

Time 2

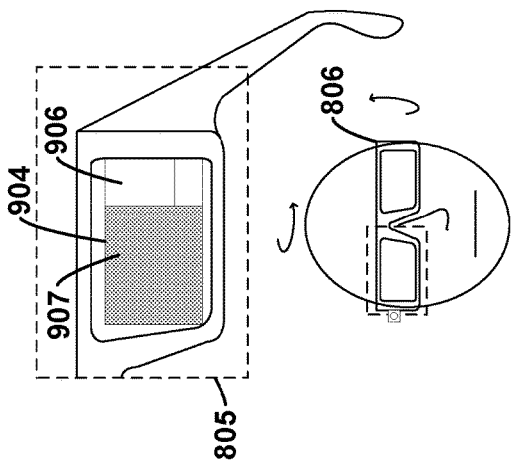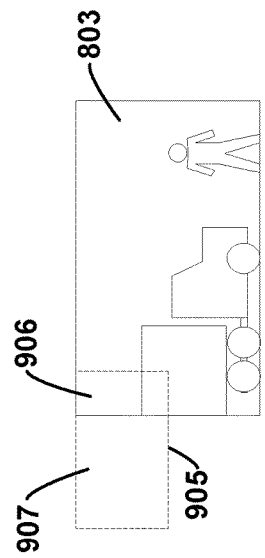
FIG. 9D
Time 2
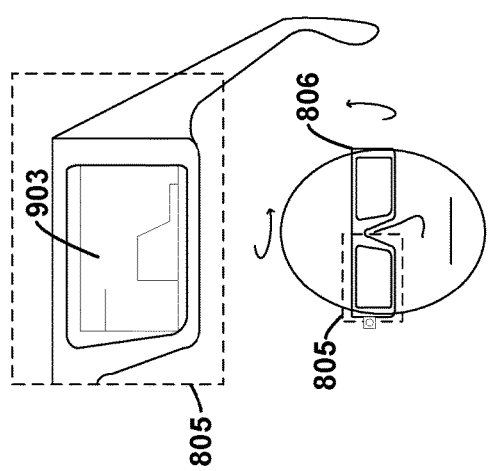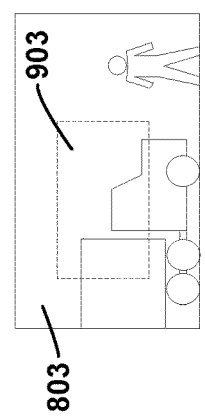
FIG. 9C
Time 2

Time 3

Time 3

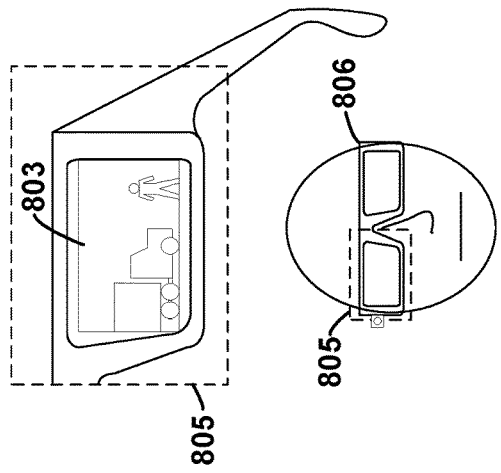
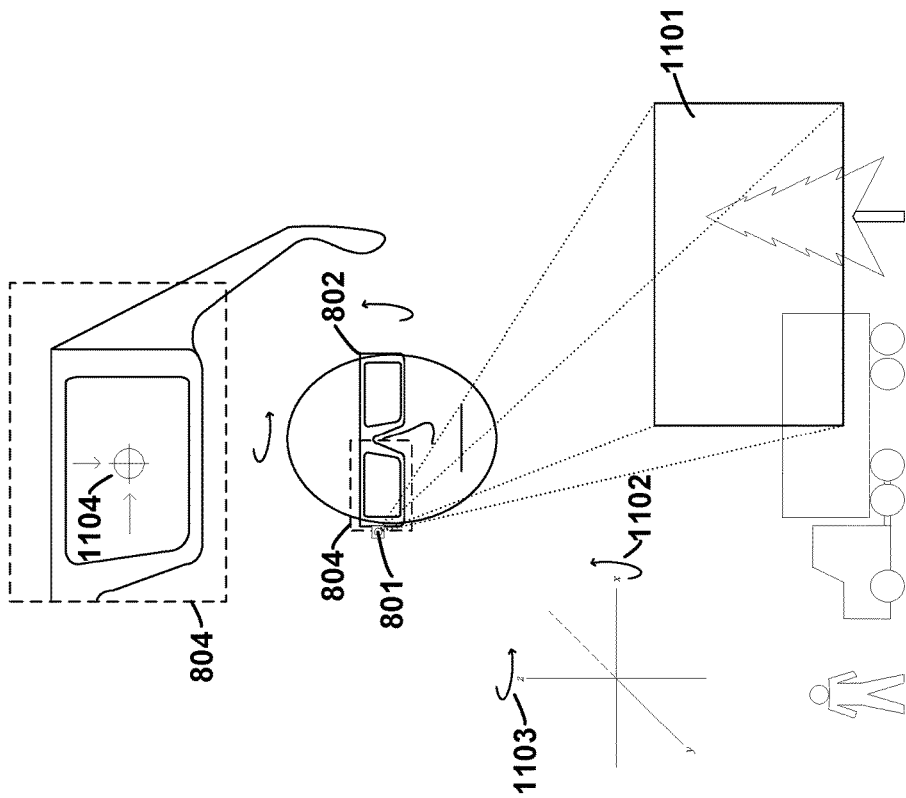
FIG. 11A
Time 4
FIG. 11B
Time 4

Time 5

Time 5

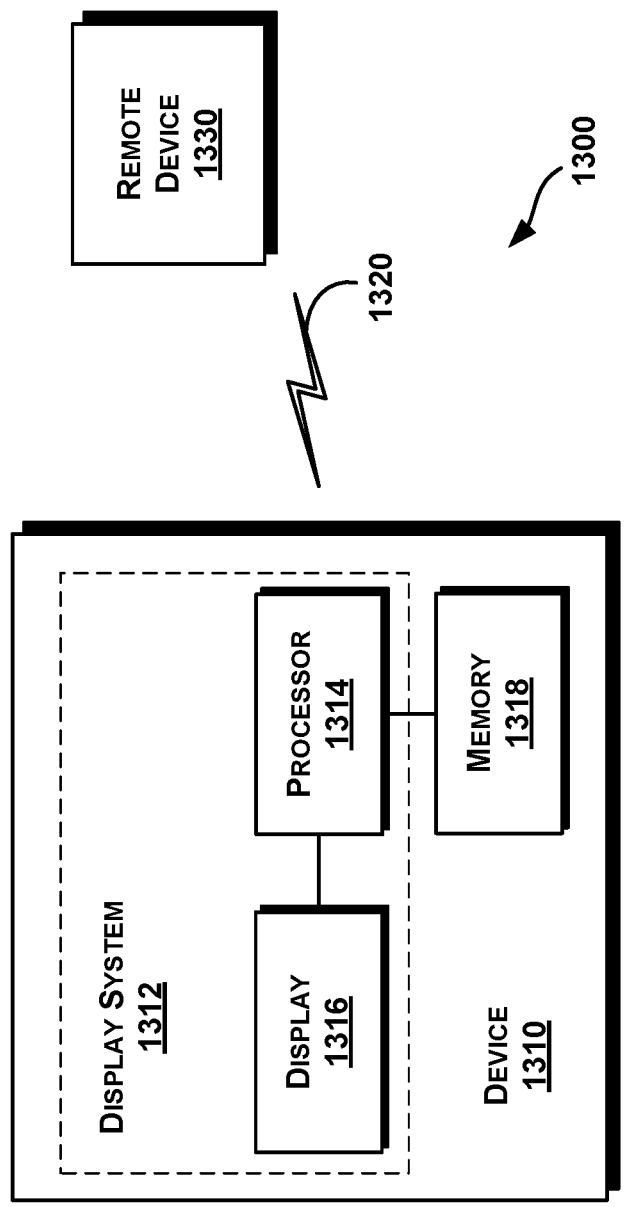

ORIENTATION OF VIDEO BASED ON THE ORIENTATION OF A DISPLAY

CROSS-REFERENCE TO RELATED APPLICATION

This application claims priority to U.S. patent application Ser. No. 13/420,253 filed on Mar. 14, 2012 and entitled "Orientation of Video Based on the Orientation of a Display," which is incorporated herein by reference as if fully set forth in this description.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. The manner in which these devices provide information to users is becoming more intelligent, efficient, intuitive, and/or less obtrusive.

Additionally, such devices can communicate with one another, either directly or indirectly, with increasing ease and in an increasing number of ways. As a result, users may readily share media or otherwise interact with each other via their devices. Such interaction may be in real time, or near-real time, as perceived by the user.

Furthermore, the trend toward miniaturization of computing hardware, peripherals, as well as of sensors, detectors, and image and audio processors, among other technologies, has helped open up a field sometimes referred to as "wearable computing." In the area of image and visual processing, a wearable camera may capture video in an orientation that corresponds to (and may be associated with) an orientation of the user's head.

Also, wearable displays may place an image display element close enough to a wearer's (or user's) eye(s) such that the displayed image fills or nearly fills the field of view, and appears as a normal sized image, such as might be displayed on a traditional image display device. The relevant technology may be referred to as "near-eye displays." Near-eye displays are components of wearable displays, also sometimes called "head-mountable displays" (HMDs).

SUMMARY

Emerging and anticipated applications of wearable computing systems include applications in which users interact in real time with other users. For example, a wearable computing system (e.g., including a head-mountable display (HMD)) of a user may capture and stream video data to another user's HIVID. In such a case, potentially disruptive (or otherwise burdensome) forms of communication, including but not limited to verbal communications, may be required if the receiving user desires a change in orientation of the video data. Therefore, an improvement is desired.

The systems and methods described herein generally relate to orientation of video based on the orientation of a display. In one example embodiment, a system is provided. The system may include: (1) an image-capture device; (2) a non-transitory computer readable medium; and (3) program instructions stored on the non-transitory computer readable medium and executable by at least one processor to cause a first computing device to: (a) receive first video data, the first video data corresponding to a first orientation of the image-capture device; (b) send the first video data to a second computing device; (c) receive, from the second computing device, first orientation data indicating a requested orientation of the image-capture device; (d) cause a visual depiction of the requested orientation to be displayed on a graphical display; (e) receive second video data, the second video data corresponding to a second orientation of the image-capture device, where the second orientation is closer to the requested orientation than is the first orientation; and (f) send the second video data to the second computing device.

In a further aspect, a computer implemented method is provided. The method may involve: (1) receiving first video data, the first video data corresponding to a first orientation of an image-capture device; (2) sending the first video data to a second computing device; (3) receiving, from the second computing device, first orientation data indicating a requested orientation of the image-capture device; (4) causing a visual depiction of the requested orientation to be displayed on a graphical display; (5) receiving second video data, the second video data corresponding to a second orientation of the image-capture device, where the second orientation is closer to the requested orientation than is the first orientation; and (6) sending the second video data to the second computing device.

In a further aspect, a non-transitory computer-readable medium is provided. The non-transitory computer-readable medium may include: (1) instructions for receiving first video data, the first video data corresponding to a first orientation of the image-capture device; (2) instructions for sending the first video data to a second computing device; (3) instructions for receiving, from the second computing device, first orientation data indicating a requested orientation of the image-capture device; (4) instructions for causing a visual depiction of the requested orientation to be displayed on a graphical display; (5) instructions for receiving second video data, the second video data corresponding to a second orientation of the image-capture device, where the second orientation is closer to the requested orientation than is the first orientation; and (6) instructions for sending the second video data to the second computing device.

In a further aspect, a system is provided. The system may include: (1) a non-transitory computer readable medium; and (2) program instructions stored on the non-transitory computer readable medium and executable by at least one processor to cause a second computing device to: (a) receive first video data from a first computing device, the first video data corresponding to a first orientation of an image-capture device; (b) cause at least a first portion of the first video data to be displayed on a graphical display; (c) receive first orientation data indicating an orientation of the graphical display, where the orientation of the graphical display corresponds to a requested orientation of the image-capture device; (d) send the first orientation data to the first computing device; (e) receive second video data from the first computing device, the second video data corresponding to a second orientation of the image-capture device, where the second orientation is closer to the requested orientation than is the first orientation; and (f) cause at least a portion of the second video data to be displayed on the graphical display.

In a further aspect, a computer implemented method is provided. The method may involve: (1) receiving first video data from a first computing device, the first video data corresponding to a first orientation of an image-capture device; (2) causing at least a first portion of the first video data to be displayed on a graphical display; (3) receiving first orientation data indicating an orientation of the graphical display, where the orientation of the graphical display corresponds to a requested orientation of the image-capture device; (4) sending the first orientation data to the first computing device; (5) receiving second video data from the first computing device, the second video data corresponding to a second orientation of the image-capture device, where the second orientation is closer to the requested orientation than is the first orientation; and (6) causing at least a portion of the second video data to be displayed on the graphical display.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9C shows a receiver moving his head at Time 2 and causing a second portion of the first video data to be displayed on a graphical display in accordance with the second example method at Time 2.

FIG. 9D shows a receiver moving his head at Time 2 and causing a portion of the first video data and blank space to be displayed on a graphical display in accordance with the second example method at Time 2.

FIG. 11A shows a sender moving his head at Time 4 and receiving second video data and adjusting the visual depiction in accordance with the first example method at Time 4.

FIG. 11B shows causing the first video data to be displayed on a graphical display in accordance with the second example method at Time 4.

FIG. 13 shows a simplified block diagram of an example computer network infrastructure.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I. Overview

An example embodiment may involve two computing devices. The first device, (sometimes referred to herein as the "sending device"), may include a head-mountable display (HIVID) and an image-capture device such as a camera. The second device, (sometimes referred to herein as the "receiving device"), may also include an HIVID. The two computing devices may be used by two respective users, a "sender" and a "receiver," respectively.

Figure 1:
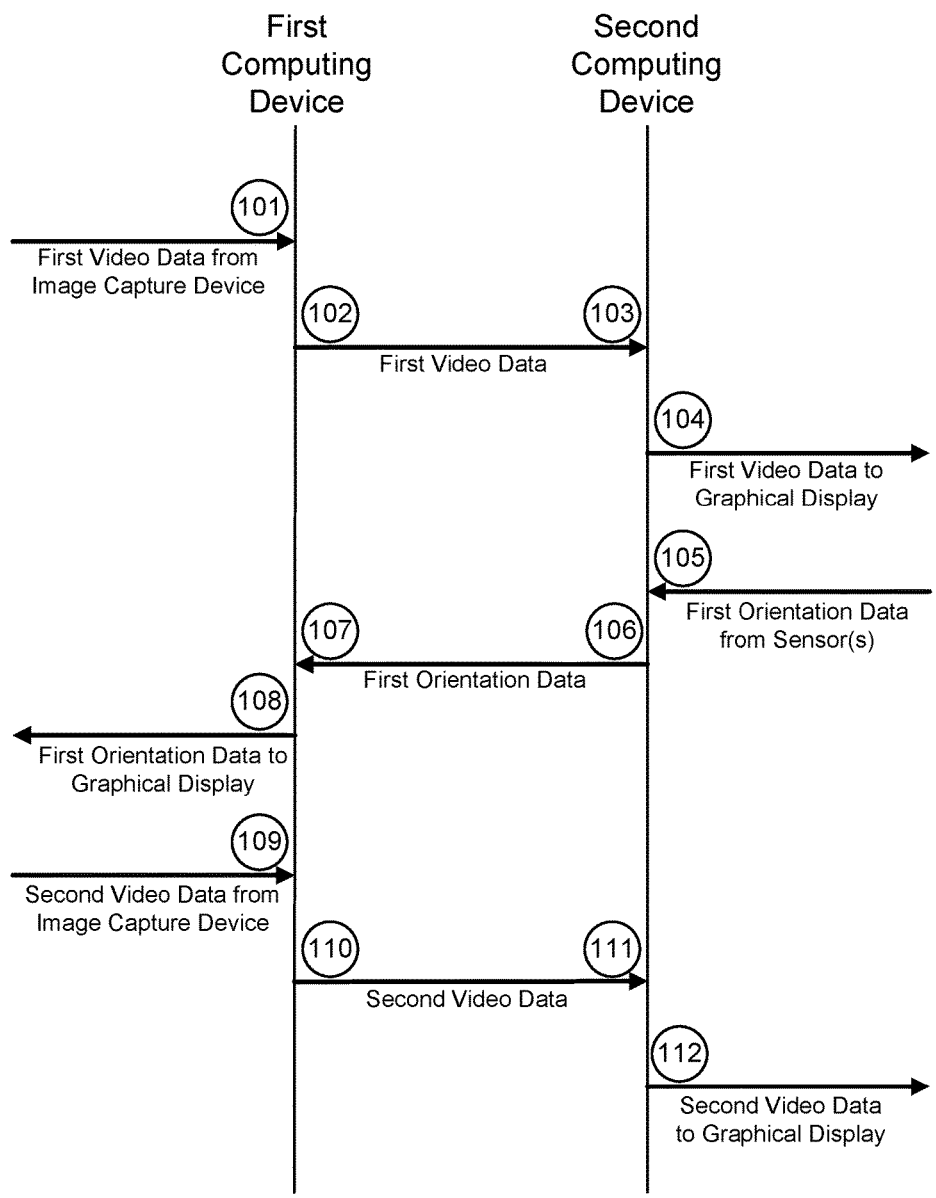
FIG. 1 shows a signal flow diagram depicting signal flow to and from computing devices in accordance with an example embodiment.

An example flow of data and interaction between the two devices is shown in the signal flow diagram of FIG. 1. As shown in FIG. 1, the first computing device may be configured to receive 101 first video data from the camera and then send 102 it to the second computing device. The second computing device may be configured to receive 103 the first video data, and then cause 104 it to be displayed on the receiver's HIVID. Next, the receiver may decide that he wants different video data, i.e., he wants the camera of the sender to be moved to a different orientation. To indicate this desire to the sender, the receiver may move his head in the desired direction of movement. For example, if the receiver desires the video to be moved up and to the left, he may move his head up and to the left.

The receiver's HIVID may include sensors which may detect movement of the HIVID and may then communicate it to the second computing device as first orientation data. Thus, the second computing device may receive 105 the orientation data from the sensors, and then send 106 it to the first computing device. After the first computing device receives 107 the orientation data, it may then cause 108 a visual indication of the first orientation data, and thus the movement of the receiver's head, to be displayed on the sender's HIVID. For example, a reticle may initially be displayed in the center of the sender's HIVID. Upon receipt of the first orientation data, the reticle may move up and to the left, mirroring the movement of the receiver's head.

The sender may then move his head in a corresponding direction, in order to "follow" the reticle. Once the sender moves his head, the camera may capture second video data in a new orientation. The first computing device may receive 109 the second video data from the camera 801, and then send 110 it to the second computing device. The second computing device may receive 111 the second video data and cause 112 it to be displayed on the receiver's HIVID. Thus, the receiver's head movements may be reflected in the video data that is received, as a result of the sender trying to keep the reticle centered in his HIVID.

It should be understood that the above example is an example embodiment, is provided for illustrative purposes, and is just one of many possible applications of an example embodiment. In particular, although certain examples are described herein as involving HMDs, it should be understood that other computing devices and/or displays may be used as well.

II. Example Wearable Computing Devices

In general, and as described above, an example system may be implemented in or may take the form of a wearable computer. However, an example system may also be implemented in or take the form of other devices, such as a mobile phone, a laptop, or a tablet device, among others. Further, an example system may take the form of non-transitory computer readable medium, which has program instructions stored thereon that are executable by one or more processors to provide the functionality described herein. An example system may also take the form of a device such as a wearable computer, mobile phone, or tablet device, or a subsystem of such a device, which includes such a non-transitory computer readable medium having such program instructions stored thereon.

Figure 2:
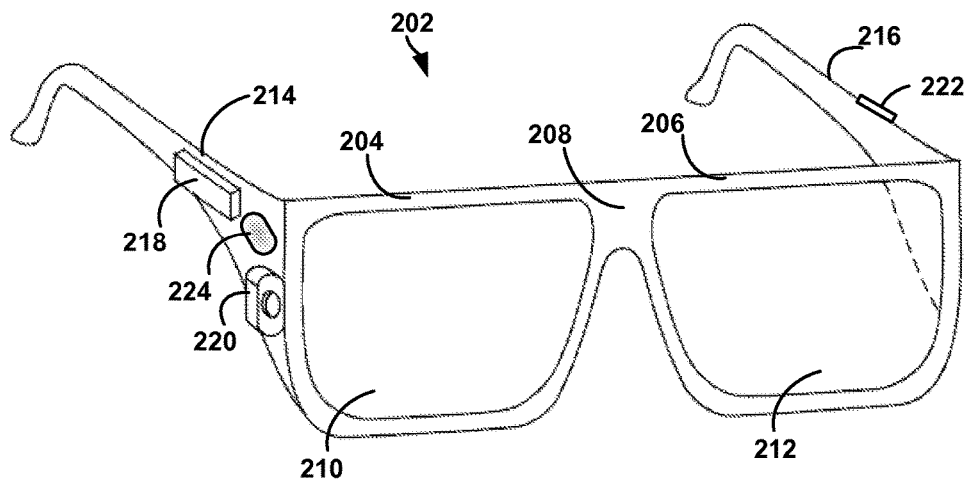
FIG. 2 shows a first view of an example wearable computing system in accordance with an example embodiment.

FIG. 2 illustrates a wearable computing system according to an example embodiment. In FIG. 2, the wearable computing system takes the form of a head-mountable display (HIVID) 202, which may also be referred to as a head-mountable device. It should be understood that an HIVID as described herein need not be worn by a user to be referred to as an HIVID. In this sense, the HIVID may be alternatively understood to be, or referred to as, a "head-mountable display." Additionally, it should be understood that example systems and devices may take the form of or be implemented within or in association with other types of devices, without departing from the scope of the invention. As illustrated in FIG. 2, the HIVID 202 comprises frame elements including lens-frames 204, 206 and a center frame support 208, lens elements 210, 212, and extending side-arms 214, 216. The center frame support 208 and the extending side-arms 214, 216 are configured to secure the HIVID 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the HIVID 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the HIVID 202 to the user. The extending side-arms 214, 216 may further secure the HIVID 202 to the user by extending around a rear portion of the user's head. Additionally or alternatively, for example, the HIVID 202 may connect to or be affixed within a head-mountable helmet structure. Other possibilities exist as well.

The HIVID 202 may also include an on-board computing system 218, a video camera 220, a sensor 222, and a finger-operable touch pad 224. The on-board computing system 218 is shown to be positioned on the extending side-arm 214 of the HIVID 202; however, the on-board computing system 218 may be provided on other parts of the HIVID 202 or may be positioned remote from the HIVID 202 (e.g., the on-board computing system 218 could be wire- or wirelessly-connected to the HIVID 202). The on-board computing system 218 may include a processor and memory, for example. The on-board computing system 218 may be configured to receive and analyze data from the video camera 220, the sensor 222, and the finger-operable touch pad 224 (and possibly from other sensory devices, user interfaces, or both) and generate images for output by the lens elements 210 and 212.

The video camera 220 is shown positioned on the extending side-arm 214 of the HIVID 202; however, the video camera 220 may be provided on other parts of the HIVID 202. The video camera 220 may be configured to capture images at various resolutions or at different frame rates. Many video cameras with a small form-factor, such as those used in cell phones or webcams, for example, may be incorporated into an example of the HIVID 202.

Further, although FIG. 2 illustrates one video camera 220, more video cameras may be used, and each may be configured to capture the same view, or to capture different views. For example, the video camera 220 may be forward facing to capture at least a portion of the real-world view perceived by the user, as described in the example embodiment above.

The sensor 222 is shown on the extending side-arm 216 of the HIVID 202; however, the sensor 222 may be positioned on other parts of the HIVID 202. The sensor 222 may include one or more of a gyroscope, an accelerometer, or a magnetic field sensor, for example. Other sensing devices may be included within, or in addition to, the sensor 222, or other sensing functions may be performed by the sensor 222.

The finger-operable touch pad 224 is shown on the extending side-arm 214 of the HIVID 202. However, the finger-operable touch pad 224 may be positioned on other parts of the HIVID 202. Also, more than one finger-operable touch pad may be present on the HIVID 202. The finger-operable touch pad 224 may be used by a user to input commands. The finger-operable touch pad 224 may sense at least one of a position and a movement of a finger via capacitive sensing, resistance sensing, or a surface acoustic wave process, among other possibilities. The finger-operable touch pad 224 may be capable of sensing finger movement in a direction parallel or planar to the pad surface, in a direction normal to the pad surface, or both, and may also be capable of sensing a level of pressure applied to the pad surface. The finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

Figure 3:
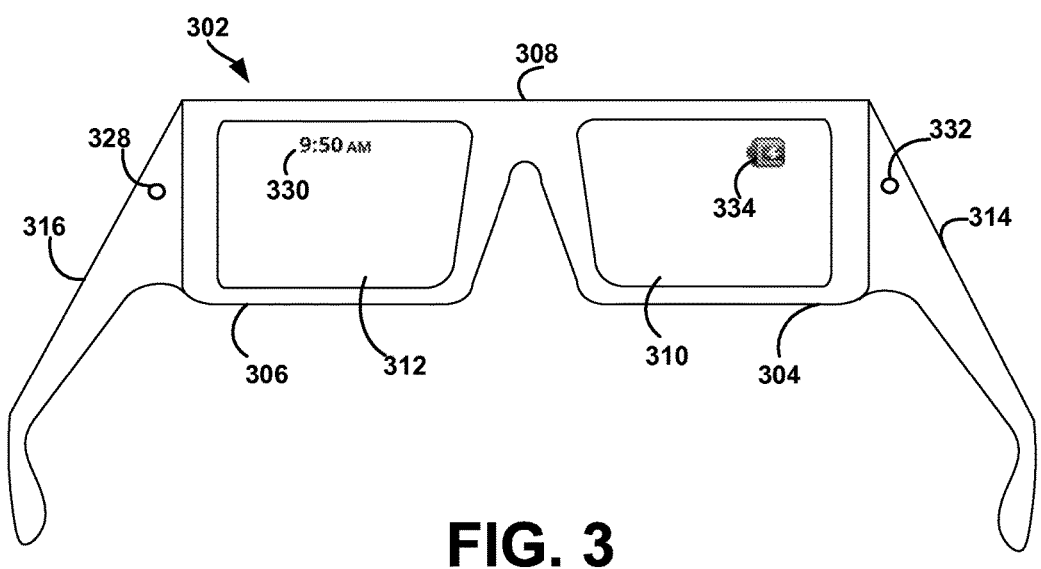
FIG. 3 shows a second view of the example wearable computing system shown in FIG. 2.

FIG. 3 illustrates an alternate view of the wearable computing device illustrated in FIG. 2. As shown in FIG. 3, the lens elements 310, 312 may act as display elements. The HIVID 302 may include a first projector 328 coupled to an inside surface of the extending side-arm 316 and configured to project a display 330 onto an inside surface of the lens element 312. Additionally or alternatively, a second projector 332 may be coupled to an inside surface of the extending side-arm 314 and configured to project a display 334 onto an inside surface of the lens element 310.

The lens elements 310, 312 may act as a combiner in a light projection system and may include a coating that reflects the light projected onto them from the projectors 328, 332. In some embodiments, a reflective coating may not be used (e.g., when the projectors 328, 332 are scanning laser devices).

In alternative embodiments, other types of display elements may also be used. For example, the lens elements 310, 312 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 304, 306 for driving such a matrix display. Alternatively or additionally, a laser or LED source and scanning system could be used to draw a raster display directly onto the retina of one or more of the user's eyes. Other possibilities exist as well.

Figure 4:
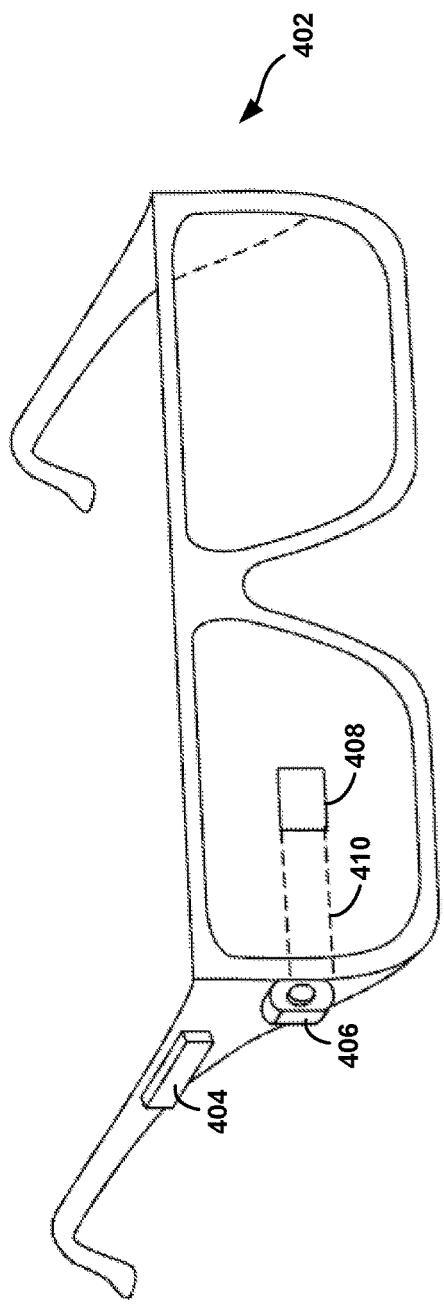
FIG. 4 shows an example wearable computing system in accordance with an example embodiment.

FIG. 4 illustrates another wearable computing system according to an example embodiment, which takes the form of an HIVID 402. The HMD 402 may include frame elements and side-arms such as those described with respect to FIGS. 2 and 3. The HIVID 402 may additionally include an on-board computing system 404 and a video camera 406, such as those described with respect to FIGS. 2 and 3. The video camera 406 is shown mounted on a frame of the HIVID 402. However, the video camera 406 may be mounted at other positions as well.

As shown in FIG. 4, the HIVID 402 may include a single display 408 which may be coupled to the device. The display 408 may be formed on one of the lens elements of the HIVID 402, such as a lens element described with respect to FIGS. 2 and 3, and may be configured to overlay computer-generated graphics in the user's view of the physical world. The display 408 is shown to be provided in a center of a lens of the HIVID 402, however, the display 408 may be provided in other positions. The display 408 is controllable via the computing system 404 that is coupled to the display 408 via an optical waveguide 410.

Figure 5:
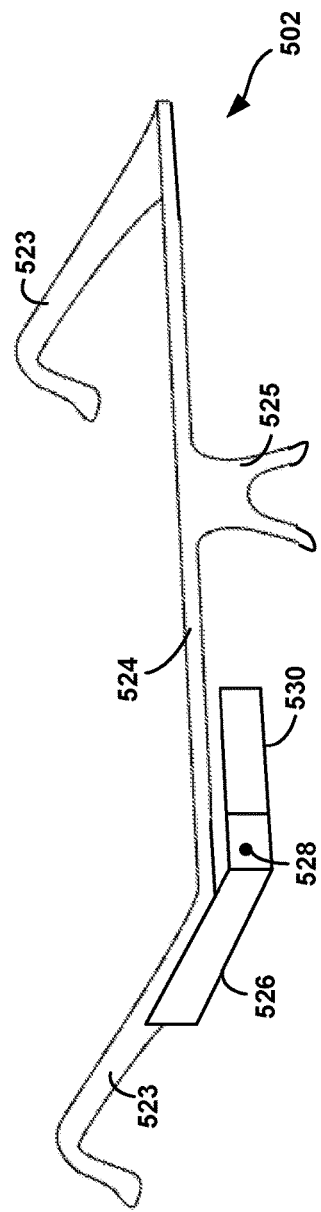
FIG. 5 shows an example wearable computing system in accordance with an example embodiment.

FIG. 5 illustrates another wearable computing system according to an example embodiment, which takes the form of an HIVID 502. The HIVID 502 may include side-arms 523, a center frame support 524, and a bridge portion with nosepiece 525. In the example shown in FIG. 5, the center frame support 524 connects the side-arms 523. The HIVID 502 does not include lens-frames containing lens elements. The HIVID 502 may additionally include an on-board computing system 526 and a video camera 528, such as those described with respect to FIGS. 2 and 3.

The HIVID 502 may include a single lens element 530 that may be coupled to one of the side-arms 523 or the center frame support 524. The lens element 530 may include a display such as the display described with reference to FIGS. 2 and 3, and may be configured to overlay computer-generated graphics upon the user's view of the physical world. In one example, the single lens element 530 may be coupled to the inner side (i.e., the side exposed to a portion of a user's head when worn by the user) of the extending side-arm 523. The single lens element 530 may be positioned in front of or proximate to a user's eye when the HIVID 502 is worn by a user. For example, the single lens element 530 may be positioned below the center frame support 524, as shown in FIG. 5.

III. Example Methods

Figure 6A:
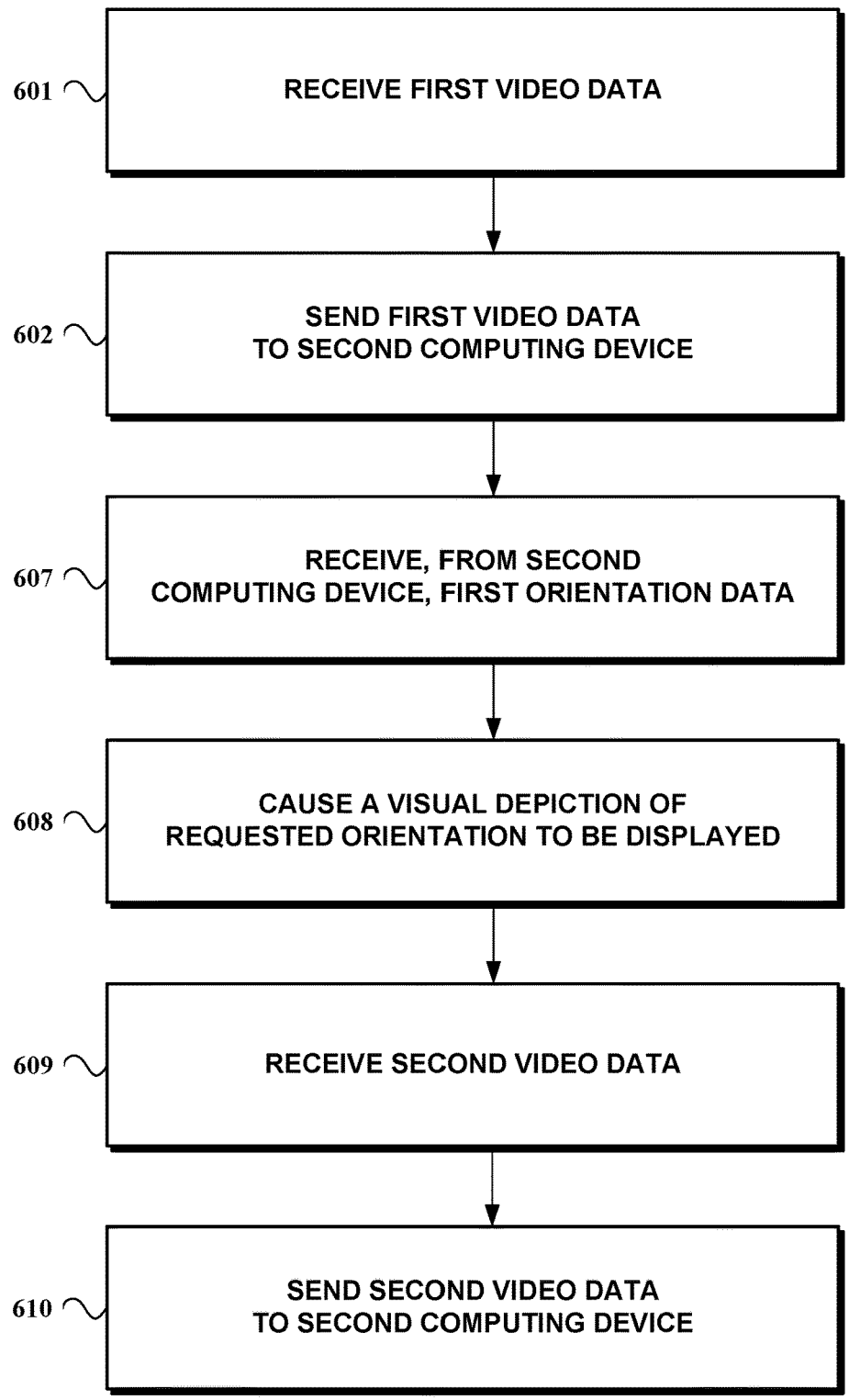
FIG. 6A shows a flowchart depicting a first example method.
Figure 6B:
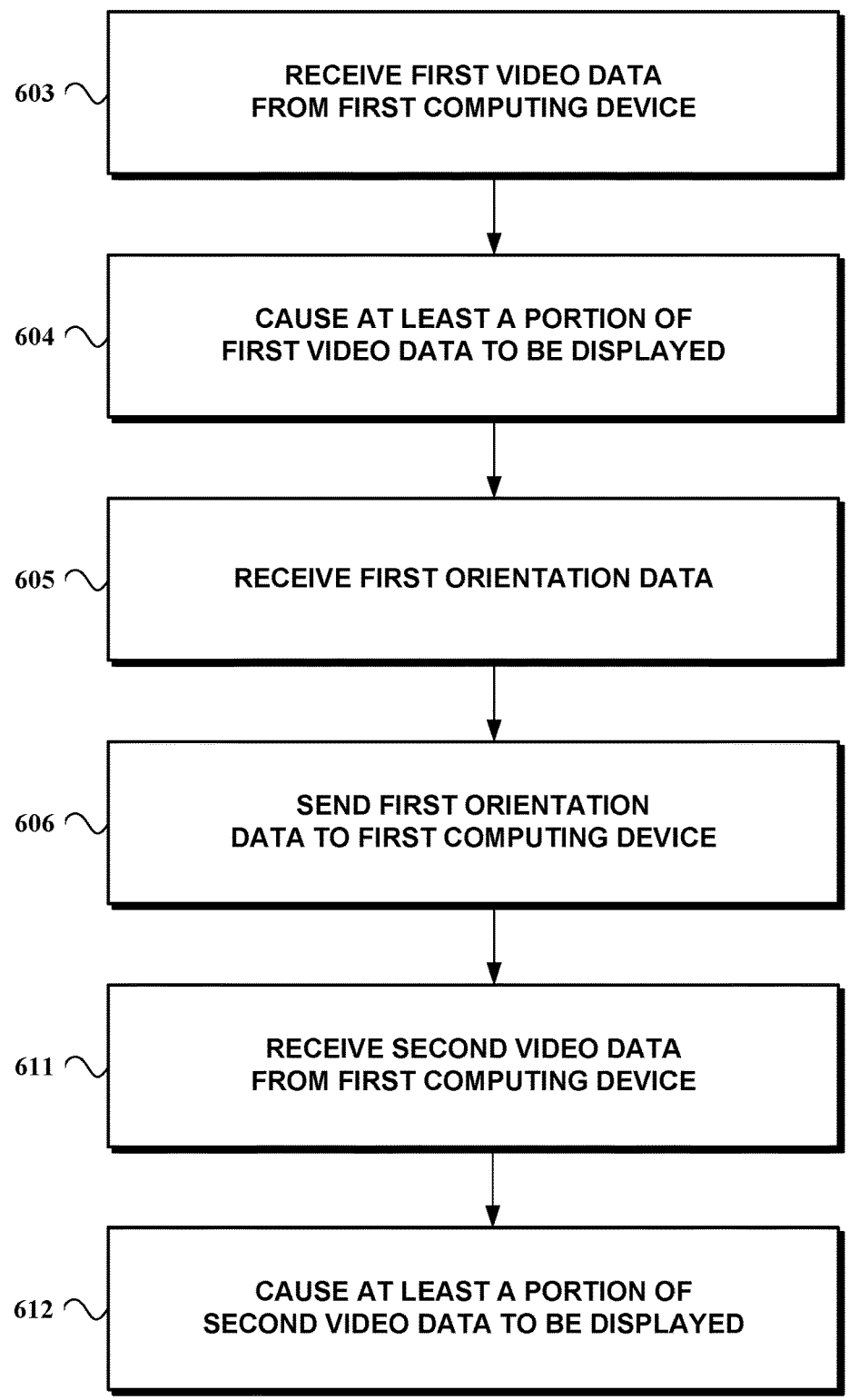
FIG. 6B shows a flowchart depicting a second example method.

FIG. 6A shows a flowchart depicting an example method implemented by a first computing device. FIG. 6B shows a flowchart depicting an example method implemented by a second computing device. For clarity, the methods will be described herein in tandem, with each step explained more fully by reference to FIGS. 8-12. FIGS. 8-12 generally correspond to a sender and a receiver at various points in time, Time 1-Time 5. Although the methods are described herein in tandem, it should be understood that neither method necessarily includes the steps of the other, and that each method may be performed independently of the other.

Further, the methods shown in FIGS. 6A and 6B are described and illustrated, by way of example, as being carried out by wearable computers and, in particular, by wearable computers that include an HIVID. The HMDs include at least one lens element, and the graphical display of each HMD is integrated into the lens element. Also, in the case of the sending device, the display is coupled to an image-capture device. However, it should be understood that example methods may be carried out by devices other than a wearable computer, and/or may be carried out by sub-systems in a wearable computer or in other devices. For example, the example methods may alternatively be carried out by other devices such as a mobile phone, laptop computer, or tablet device, either of which may include suitable display and image-capture components which may also be coupled together. Other examples are also possible.

As stated above, the example method of FIG. 6A may involve the first computing device receiving first video data, as shown in block 601. The first video data may correspond to a first orientation of the image-capture device, such as a camera. As shown in FIG. 8A, at Time 1, the orientation of the camera 801 corresponds to where the sender's head, and thus his HIVID 802, are pointed. Accordingly, the camera 801 captures first video data 803 corresponding to this orientation. In this example, the first video data 803 indicates a person standing to the right of a truck (from the sender's perspective). An enlarged view of the sender's graphical display 804 is also pictured, and will be described in further detail below. Note that the sender's HIVID 802 may also include a microphone, and may thereby receive audio data with the first video data 803.

At block 602, the first computing device may send the first video data 803 to a second computing device, which may receive the first video data 803 at block 603. Sending the first video data may include streaming the first video data, allowing for real-time or near real-time transmission and receipt of the data. Other methods of, and/or techniques for, sending the video data are also possible.

Figure 7:
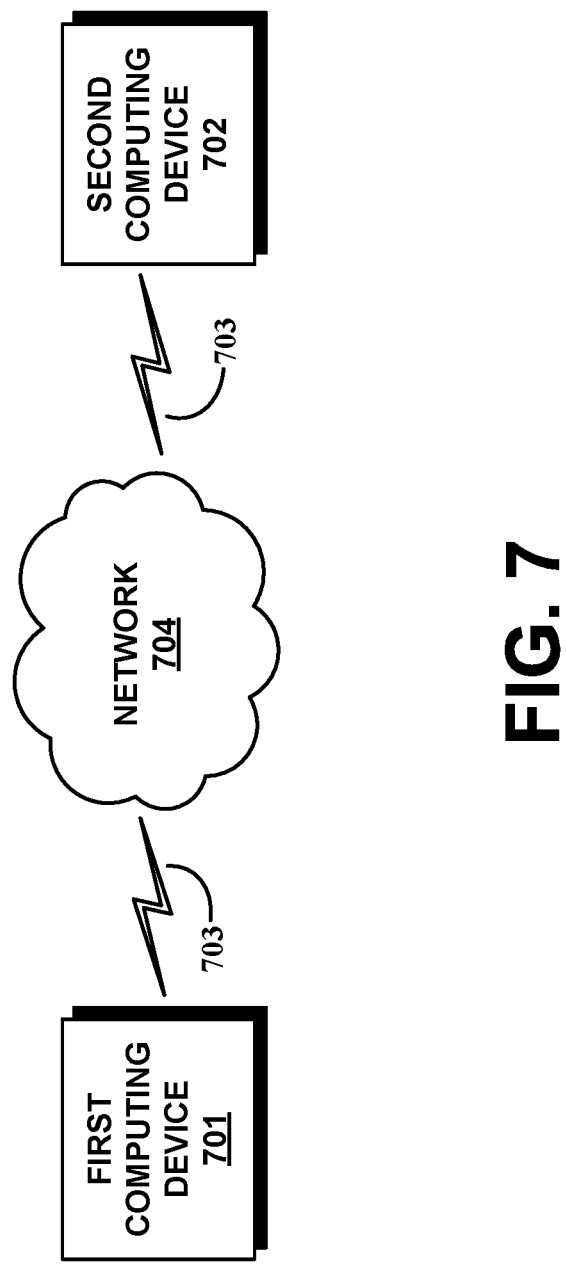
FIG. 7 shows a simplified block diagram depicting communications between computing devices in an example embodiment.

FIG. 7 shows an example of a wireless communication link 703 between the first computing device 701 and the second computing device 702. The first computing device 701 and second computing device 702 may communicate via such a wireless communication link. However, wired connections may also be used. For example, the communication link 703 may be a wired serial bus such as a universal serial bus or a parallel bus, among other connections. The communication link 703 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The computing devices 701, 702 may also communicate with one another indirectly via a network 704 such as the Internet.

Figure 8B:
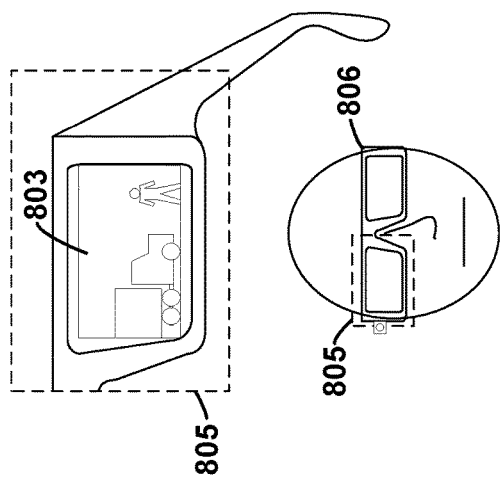
FIG. 8B shows causing the first video data to be displayed on a graphical display in accordance with the second example method at Time 1.
Figure 8A:
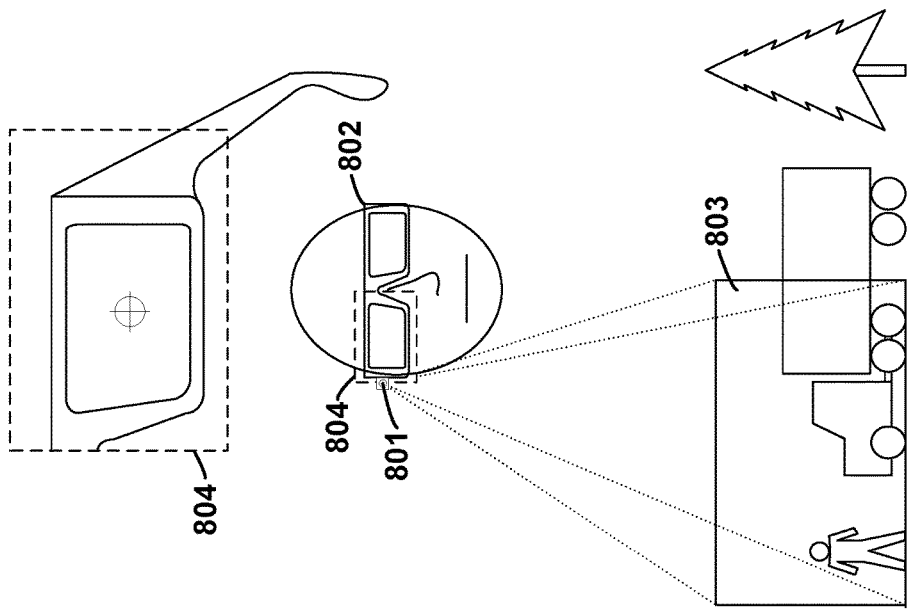
FIG. 8A shows receiving first video data in accordance with the first example method at Time 1.

Returning to the example methods, at block 604 the second computing device may cause at least a portion of the first video data 803 to be displayed on a graphical display 805, as shown in FIG. 8B at Time 1. An enlarged view of the receiver's graphical display 805 is shown, in mirror image, reflecting how the receiver may see the first video data 803 on his HMD 806, i.e., a person standing to the right of a truck.

Figure 8C:
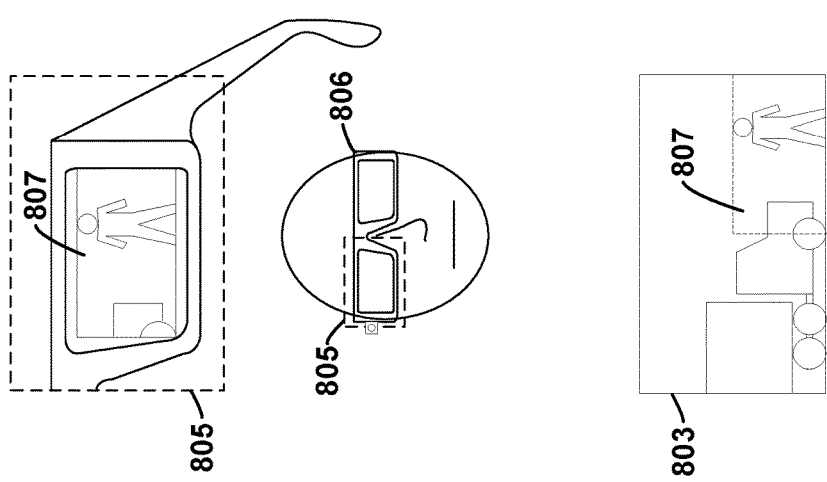
FIG. 8C shows causing a first portion of the first video data to be displayed on a graphical display in accordance with the second example method at Time 1.

In this example embodiment, the second computing device causes the full extent of the first video data 803 to be displayed. However, in an alternative embodiment the second computing device may cause only a portion of the first video data 803 to be displayed. For example, the camera 801 may capture a larger image than the receiver's graphical display 805 is capable of displaying or otherwise configured to display. FIG. 8C at Time 1 shows such an alternative where only a portion 807 of the first video data 803 is displayed on the receiver's graphical display 805.

Figure 9B:
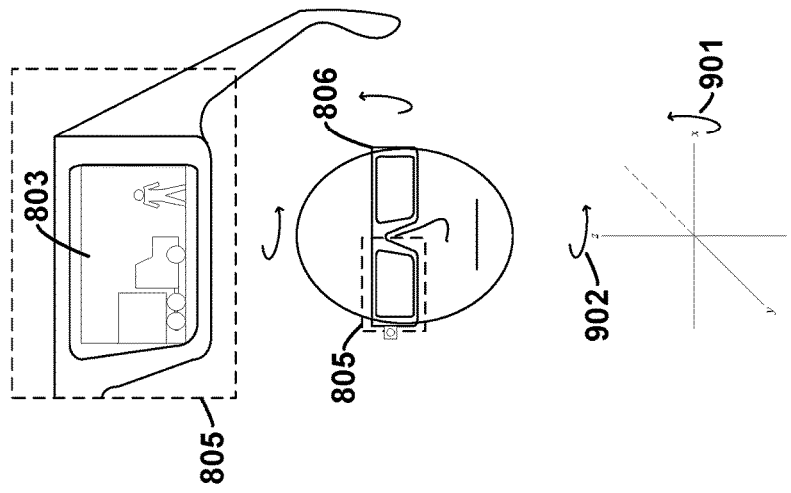
FIG. 9B shows a receiver moving his head at Time 2 and causing the first video data to be displayed on a graphical display in accordance with the second example method at Time 2.

After receipt of the first video data, the receiver may wish to view video data corresponding to a different orientation of the camera 801. In the example embodiment, where the second computing device causes the full extent of the first video data 803 to be displayed, this will require that the camera 801 be moved such that it captures different video data. For instance, the receiver may wish to view what is above and to the left of the truck shown in the first video data 803. Accordingly, the receiver may move his head and thus his HIVID 806 up and to the left, as shown in FIG. 9B at Time 2, so as to ultimately provide an indication to the sender to change the orientation of the camera 801.

The receiver's HIVID 806 may include one or more sensors such as an accelerometer, gyroscope, or magnetic field sensor, adapted to detect orientation data associated with the receiver's movement. The orientation data may indicate one rotation about one axis of a three-axis coordinate system, two rotations about two axes of a three-axis coordinate system, or three rotations about three axes of a three-axis coordinate system. Other expressions of the orientation data are also possible. FIG. 9B shows the receiver's head movement, up and to the left, expressed as two rotations. The rotation up 901 represents a change in pitch about the yz-axis, and may be expressed in degrees, radians, or any other suitable format. The other rotation, left 902, represents a change in yaw about the xy-axis, and may be similarly expressed. The sensors may also detect changes in roll about the xz-axis, not pictured in this example. Alternatively, changes in roll may be ignored, such that yaw always remains in the horizontal plane of the video data.

Whatever the format of the orientation data, at block 605 the second computing device may receive the first orientation data from the sensor(s) indicating the orientation of the receiver's graphical display 805, which corresponds to the receiver's requested orientation of the camera 801. At block 606, the second computing device may send the first orientation data to the first computing device.

Alternatively, the requested orientation may not require a movement of the camera 801. This may be the case if only a portion 807 of the first video data 803 is displayed, as shown in FIG. 8C at Time 1. A depiction of this alternative is continued in FIG. 9C at Time 2. In this case, after receiving the first orientation data, the second computing device may cause a second portion 903 of the first video data 803 to be displayed on the graphical display based on the first orientation data. The second computing device may not send the first orientation data to the first computing device in this situation. In this regard, the second computing device may not send any orientation data to the first computing device until the receiver's head movements, and thus a requested orientation, exceeds the extent of the first video data 803 that is available for display by the second computing device.

Returning to the example methods, once the second computing device sends the first orientation data at block 606, the first computing device may receive the first orientation data at block 607. At block 608, the first computing device may cause a visual depiction of the requested orientation to be displayed on the sender's graphical display 804. In FIG. 10A, at Time 3, the visual depiction is represented as the movement of a reticle 1001 on the sender's graphical display 804. The movement of the reticle is up and to the left, corresponding to the requested orientation.

Those of skill in the art will appreciate that a moveable reticle is only one possible example of a visual depiction of the requested orientation, and that the visual depiction may take any suitable form that conveys the requested orientation to the sender. For example, the visual depiction may be an arrow which is moveable, or which may change in direction and/or length to indicate the requested orientation of the camera 801. Alternatively, the visual depiction may take the form of a flashing light at one or more of the edges of the sender's graphical display 804, similarly indicating the requested orientation. The visual depiction may also take the form of text on the graphical display 804, such as "Left" and/or "Up". Other examples are also possible.

After the visual depiction of the requested orientation has been displayed on the sender's graphical display 804, he may move his head in response. For example, in FIG. 11A, at Time 4, the sender moves his head up and to the left. This may move the sender's HIVID 802 and camera 801 up and to the left and into a second orientation, which may be closer to the requested orientation than was the camera's first orientation. The camera 801 may then capture second video data 1101 corresponding to the second orientation of the camera 801. In this case, the second video data 1101 indicates the back of the truck and the top of a tree which is to the left of the truck (from the sender's perspective). However, the second orientation of the camera 801 may be any orientation, and may not correspond exactly with the requested orientation, as further described below. Further, the second orientation of the camera 801 may be the same as the first orientation if, for instance, the sender does not move his head and his HIVID 802 in response to the requested orientation.

At block 609, the first computing device may receive the second video data 1101 from the camera 801, which it may send to the second computing device at block 610. As above, sending the second video data my include streaming the second video data. Additionally, the sender's HIVID 802 may include one or more sensors adapted to detect orientation data associated with the sender's movements, similar to those described above with respect to the receiver's HIVID 806. The first computing device may receive the second orientation data indicating the second orientation of the camera 801 from the sensor(s) and may adjust the visual depiction of the requested orientation based on the second orientation data. In FIG. 11A, at Time 4, the sender's head movements are expressed as rotational changes in pitch 1102 and yaw 1103, however the second orientation data may be expressed in any other suitable format, as noted above. After receiving the second orientation data, the first computing device may adjust the visual depiction, to reflect the fact that the orientation of the sender's HIVID has changed relative to the requested orientation. For example, as the sender moves his head up and left, in accord with the requested orientation, the reticle may move proportionally down and to the right 1104, i.e., back to center.

Figure 12B:
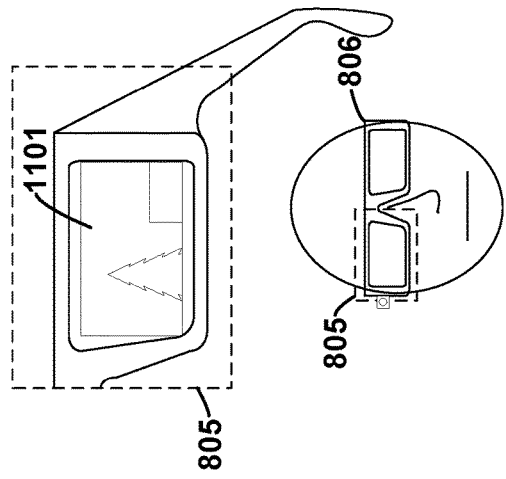
FIG. 12B shows causing the second video data to be displayed on a graphical display in accordance with the second example method at Time 5.

After the second video data is sent to the second computing device at block 610, via streaming or any other method, the second computing device may receive the second video data from the first computing device at block 611. At block 612, the second computing device may cause at least a portion of the second video data 1101 to be displayed on the receiver's graphical display 805, as shown in FIG. 12B at Time 5. Thus, the receiver's movements may be reflected in the video data that is received, as a result of the sender trying to keep the reticle centered in his HIVID 802.

However, the sender's head movements and the resulting second orientation of the camera may not correspond exactly to the requested orientation. In this case, the reticle may not return to the exact center of the sender's graphical display 804. Further, both users may find it difficult to remain completely still while sending and receiving video data, which may result in unintentional reticle movements, and possible confusion regarding intentional head movements. It may be desirable to mitigate such an effect. Accordingly, in some embodiments, a threshold distance from the requested orientation may be defined. The threshold may be, for instance, five degrees of rotation in any direction from the requested orientation. Other examples are also possible, and the threshold may be defined or expressed in any format.

Figure 9A:
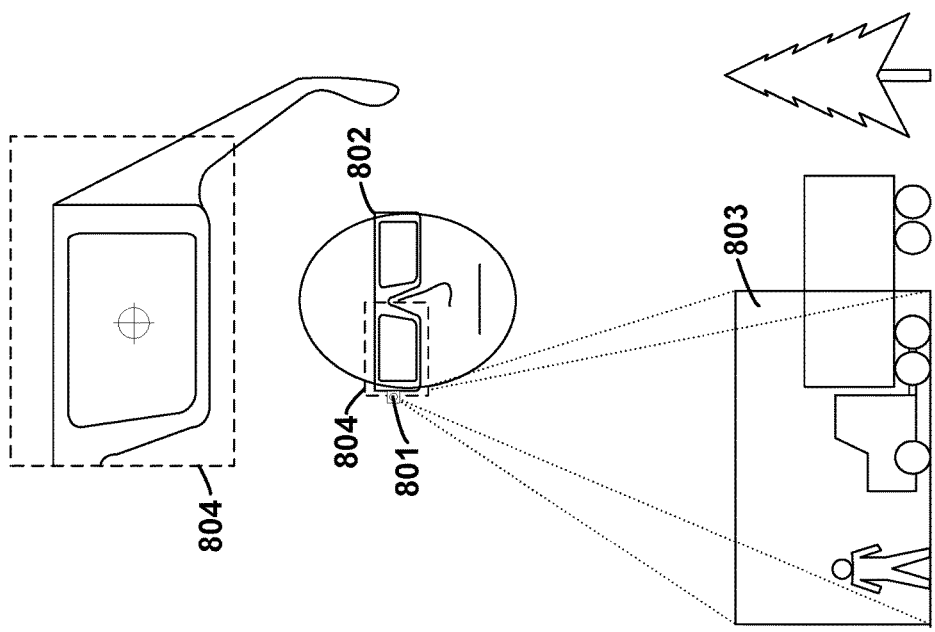
FIG. 9A shows receiving first video data in accordance with the first example method at Time 2.
Figure 12A:
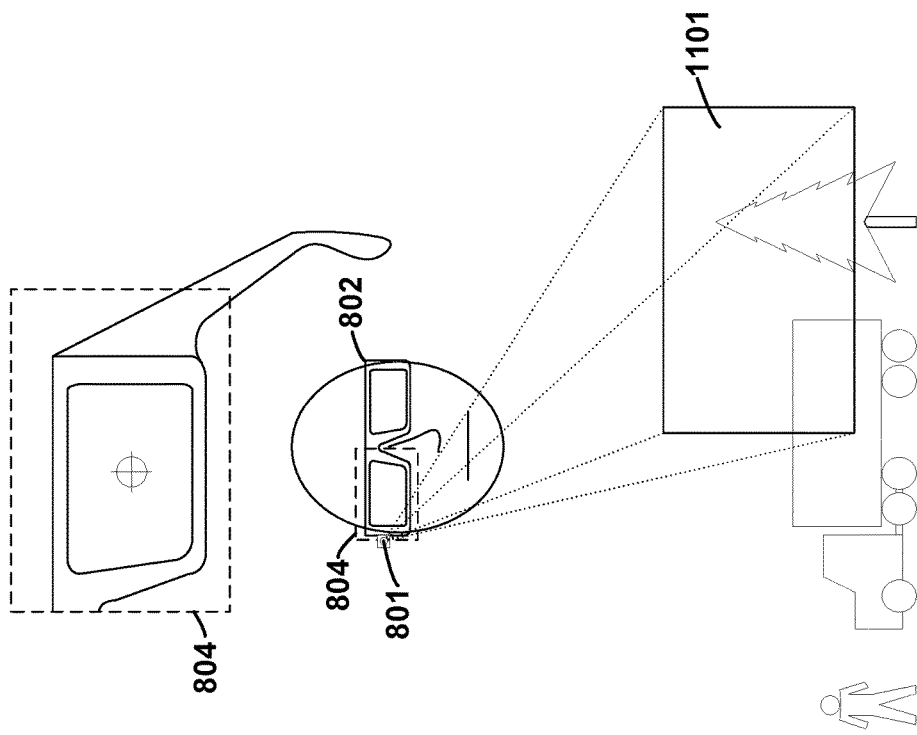
FIG. 12A shows receiving second video data in accordance with the first example method at Time 5.

When the orientation of the camera 801 is within the threshold distance of the requested orientation, i.e. when it is "close enough," the first computing device may provide an indication that the orientation is within the threshold distance. For example, it may provide an audible indication that the orientation of the camera 801 is within the threshold. Additionally or alternatively, the first computing device may provide a visual indication on the sender's graphical display 804 when the orientation of the camera 801 is within the threshold. For example, the first computing device may modify one or more attributes of the reticle based on one or both of the orientation of the camera 801 and the requested orientation. For example, the reticle may change in size, shape, and/or color to indicate a satisfactory orientation. It may change in brightness, contrast, and/or transparency such that it becomes less visible, or fades entirely from the sender's graphical display 804. Further, the first computing device may be configured such that the reticle remains motionless if the orientation of the camera 801 remains within the threshold. In this case, the reticle may simply stay in the center of the sender's graphical display 804, as shown in FIGS. 8A, 9A, and 12A.

Those of skill in the art will appreciate that when the second computing device displays only a portion 807, 903 of the first video data 803, as shown in FIGS. 8C and 9C, a similar threshold effect may be utilized. In such a case, if the requested orientation of the camera 801 remains within the extent of the first video data 803, there may be no need for the orientation of the camera 801 to be adjusted. Thus, a threshold as described above may implicitly exist at the extent of the first video data 803. Other thresholds may also be defined.

Further, the first computing device may be configured to indicate when the orientation of the camera 801 is not within a threshold distance of the requested orientation. For example, an audible indication may be provided, indicating to the sender that it is time to move the camera. Additionally or alternatively, the first computing device may provide a visual indication on the sender's graphical display 804 based on one or both of the orientation of the camera 801 and the requested orientation data. The visual indication may include moving the reticle as shown in FIG. 10A, and may also include a modification of one or more attributes of the reticle. The attributes may be modified in any of the ways described above or in any other manner. Furthermore, the notification(s) may increase in intensity or otherwise change as the distance between the camera's orientation and the requested orientation increases. For example, an audible alert may become louder, and/or the reticle may change colors, flash, or become brighter. Other examples are also possible.

The second computing device may be similarly configured to indicate whether the orientation of the camera 801 is within a threshold distance of the requested orientation. The threshold may be the same as or different from a threshold used by the first computing device, and the indication may take any of the forms described above or any other form, audible, visible, or otherwise.

Figure 10B:
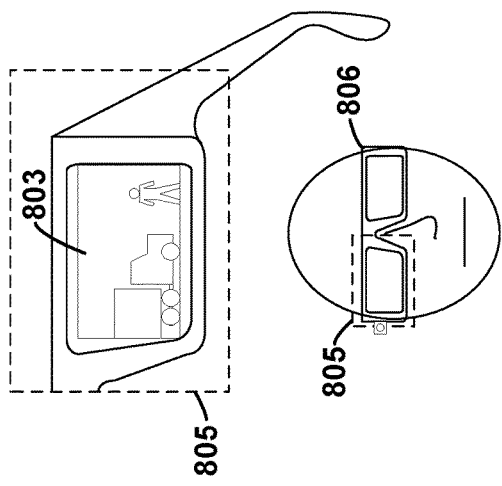
FIG. 10B shows causing the first video data to be displayed on a graphical display in accordance with the second example method at Time 3.
Figure 10A:
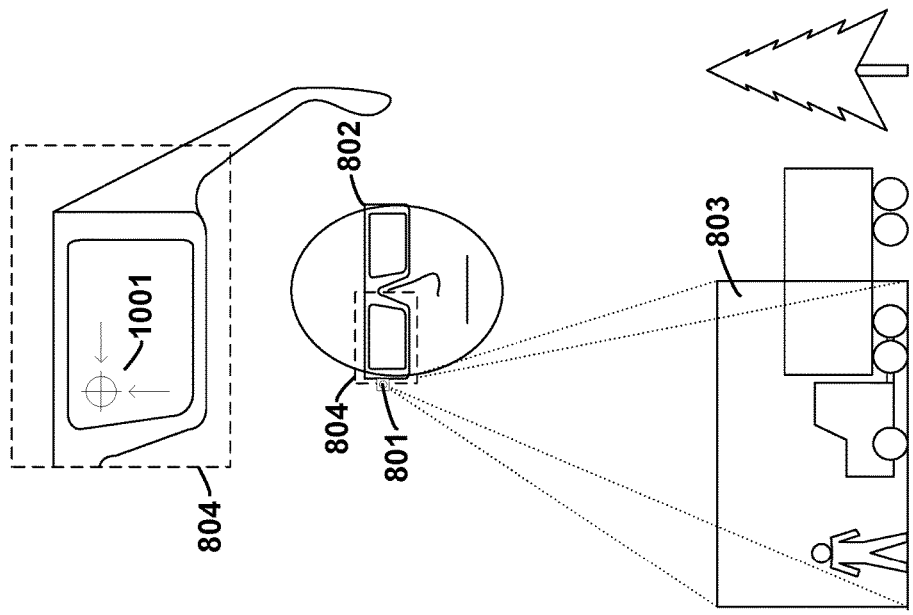
FIG. 10A shows a visual depiction of a requested orientation displayed on a graphical display in accordance with the first example method at Time 3.

For example, in FIGS. 9B, 10B, and 11B, the receiver has moved his head and his HIVID 806, but his graphical display 805 still displays the first video data 803 because the second computing device has not yet received second video data 1101 to be displayed. In some embodiments, the second computing device may cause a visual indication to appear on the receiver's graphical display 805, indicating that the orientation of the camera 801 is not within the threshold. The visual indication may be displayed in addition to the displayed first video data 803. For instance, the indication may be a reticle, an arrow, a flashing light, and/or text, and may indicate the camera's current orientation in relation to the requested orientation. Additionally or alternatively, the second computing device may modify a display attribute of the receiver's graphical display 805. For instance, the graphical display 805 may change from color to black-and-white, reduce in brightness, contrast, transparency, or otherwise indicate to the receiver that the orientation of the camera 801 is not within the given threshold.

In some embodiments, the second computing device may be configured to display a visual indication that includes blank space when the orientation of the camera 801 is outside a given threshold. For instance, the second computing device may display a portion of the first or second video data, if available, within a given viewing region 904 of the graphical display 805 in conjunction with a visual indication of blank space within the given viewing region 904. Such an alternative is shown in FIG. 9D at Time 2, where the receiver has moved his head and HIVID 806, and thus his graphical display 805, to indicate a requested orientation 905 of the camera 801. The requested orientation is such that the first orientation of the camera 801, and thus the first video data 803, indicates only a portion 906 of the requested video. The receiver's graphical display 805 may correspondingly display the available portion 906 of the first video data 803 in the given viewing region 904, in conjunction with blank space 907 also in the given viewing region 904. The blank space 907 may be displayed until such time as the second video data 1101 is received and displayed.

Those skilled in the art will understand that the flowcharts 6A and 6B described above illustrate functionality and operation of certain implementations of example embodiments. In this regard, each block of the flowchart may represent a module, a segment, or a portion of program code, which includes one or more instructions executable by a processor (e.g., processor 1402 described below with respect to system 1400) for implementing specific logical functions or steps in the process. The program code may be stored on any type of computer readable medium (e.g., computer readable storage medium or non-transitory media, such as memory 1404 or storage device 1424 described below with respect to system 1400), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, depending on the functionality involved, as would be understood by those reasonably skilled in the art.

IV. Example Computing System and Network Architecture

FIG. 13 shows a simplified block diagram of an example computer network infrastructure. In system 1300, a device 1310 communicates using a communication link 1320 (e.g., a wired or wireless connection) to a remote device 1330. The device 1330 may be any type of device that can receive data and display information corresponding to or associated with the data. For example, the device 1330 may be a heads-up display system, such as the HMD 202, 402, or 522 described with reference to FIGS. 2-5.

Thus, the device 1310 may include a display system 1312 comprising a processor 1314 and a display 1316. The display 1316 may be, for example, an optical see-through display, an optical see-around display, or a video see-through display. The processor 1314 may receive data from the remote device 1330, and configure the data for display on the display 1316. The processor 1314 may be any type of processor, such as a micro-processor or a digital signal processor, for example.

The device 1310 may further include on-board data storage, such as memory 1318 coupled to the processor 1314. The memory 1318 may store software that can be accessed and executed by the processor 1314, for example.

The remote device 1330 may be any type of computing device or transmitter including a laptop computer, a mobile telephone, or tablet computing device, etc., that is configured to transmit data to the device 1310. The remote device 1330 and the device 1310 may contain hardware to enable the communication link 1320, such as processors, transmitters, receivers, antennas, etc.

In FIG. 13, the communication link 1320 is illustrated as a wireless connection; however, wired connections may also be used. For example, the communication link 1320 may be a wired serial bus such as a universal serial bus or a parallel bus, among other connections. The communication link 1320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 1330 may be accessible via the Internet and may include a computing cluster associated with a particular web service (e.g., social-networking, photo sharing, address book, etc.).

Figure 14:
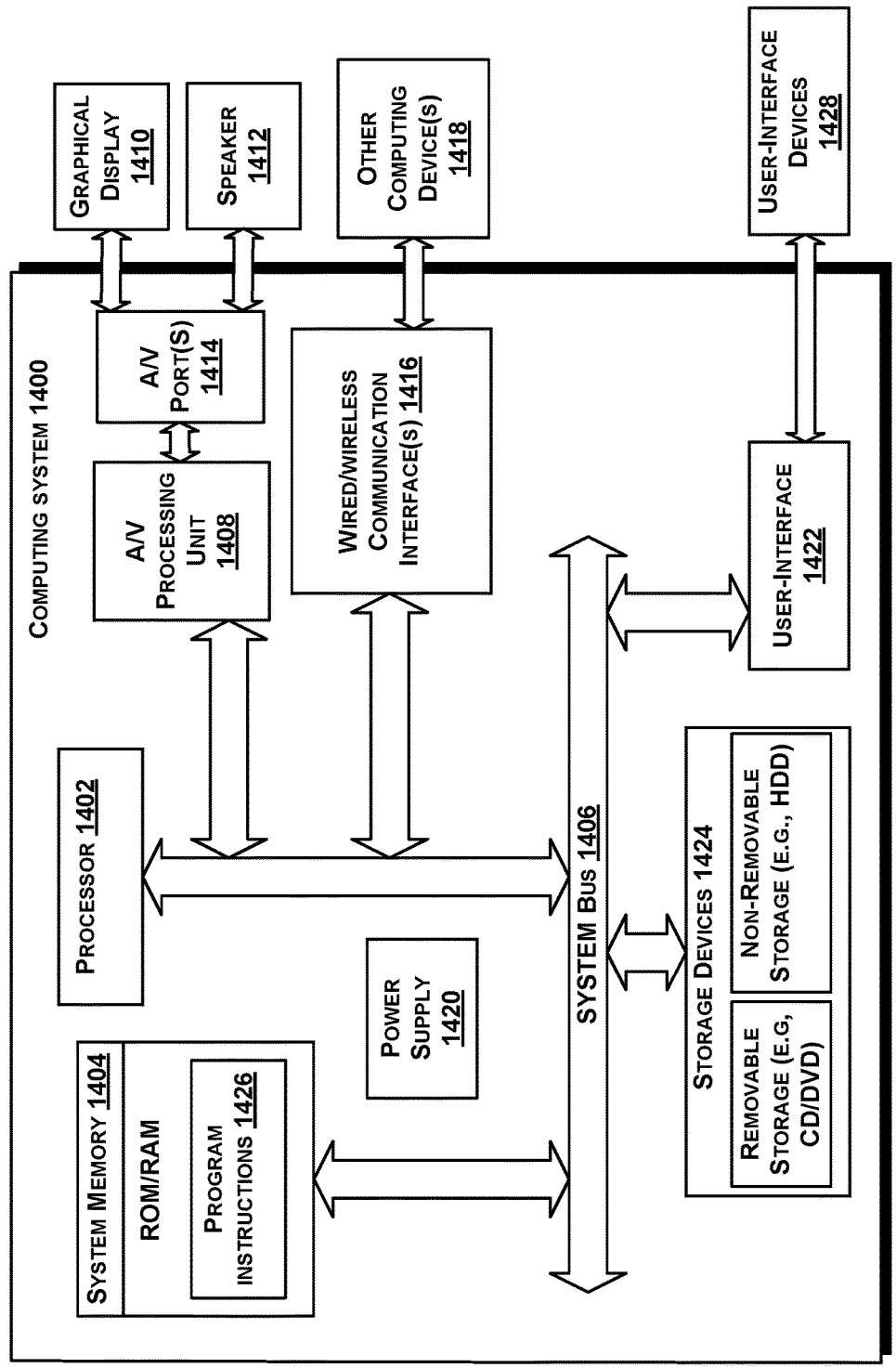
FIG. 14 shows a simplified block diagram depicting example components of an example computing system.

As described above in connection with FIGS. 2 and 4, an example wearable computing device may include, or may otherwise be communicatively coupled to, a computing system, such as computing system 118 or computing system 204. FIG. 14 shows a simplified block diagram depicting example components of an example computing system 1400. One or both of the device 1310 and the remote device 1330 may take the form of computing system 1400.

Computing system 1400 may include at least one processor 1402 and system memory 1404. In an example embodiment, computing system 1400 may include a system bus 1406 that communicatively connects processor 1402 and system memory 1404, as well as other components of computing system 1400. Depending on the desired configuration, processor 1402 can be any type of processor including, but not limited to, a microprocessor (µP), a microcontroller (µC), a digital signal processor (DSP), or any combination thereof. Furthermore, system memory 1404 can be of any type of memory now known or later developed including but not limited to volatile memory (such as RAM), non-volatile memory (such as ROM, flash memory, etc.) or any combination thereof.

An example computing system 1400 may include various other components as well. For example, computing system 1400 includes an A/V processing unit 1408 for controlling graphical display 1410 and speaker 1412 (via A/V port 1414), one or more communication interfaces 1416 for connecting to other computing devices 1418, and a power supply 1420. Graphical display 1410 may be arranged to provide a visual depiction of various input regions provided by user-interface module 1422. User-interface module 1422 may be further configured to receive data from and transmit data to (or be otherwise compatible with) one or more user-interface devices 1428.

Furthermore, computing system 1400 may also include one or more data storage devices 1424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 1400.

According to an example embodiment, computing system 1400 may include program instructions 1426 that are stored in system memory 1404 (and/or possibly in another data-storage medium) and executable by processor 1402 to facilitate the various functions described herein including, but not limited to, those functions described with respect to FIGS. 6A and 6B. Although various components of computing system 1400 are shown as distributed components, it should be understood that any of such components may be physically integrated and/or distributed according to the desired configuration of the computing system.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
    a non-transitory computer readable medium; and
    program instructions stored on the non-transitory computer readable medium and executable by at least one processor to cause a sharer mobile device to:
    receive first video data, the first video data corresponding to a first orientation of an image-capture device that is arranged on the sharer mobile device;
    send the first video data to a viewer mobile device;
    receive, from the viewer mobile device, orientation data indicating a requested orientation of the image-capture device, wherein the requested orientation is based on movement data generated at the viewer mobile device in accordance with a movement of the viewer mobile device;
    cause a graphical image indicative of the requested orientation to be displayed on a graphical display of the sharer mobile device;
    receive second video data, the second video data corresponding to a second orientation of the image-capture device arranged on the sharer mobile device;
    determine that the second orientation is within a threshold from the requested orientation; and
    responsive to the determination, send the second video data to the viewer mobile device.

2. The system of claim 1, wherein the graphical image indicative of the requested orientation moves on the graphical display of the sharer mobile device based on the orientation data received from the viewer mobile device.

3. The system of claim 2, wherein the graphical image indicative of the requested orientation moving on the graphical display of the sharer mobile device based on the orientation data received from the viewer mobile device comprises the graphical image indicative of the requested orientation moving on the graphical display of the sharer mobile device based on the movement data generated at the viewer mobile device.

4. The system of claim 1, wherein sending the first video data comprises streaming the first video data, and wherein sending the second video data comprises streaming the second video data.

5. The system of claim 1, wherein the orientation data indicates one of (i) one rotation about one axis of a three-axis coordinate system, (ii) two rotations about two axes of a three-axis coordinate system, and (iii) three rotations about three axes of a three-axis coordinate system.

6. The system of claim 1, further comprising program instructions stored on the non-transitory computer readable medium and executable by at least one processor to cause the sharer mobile device to:
    receive further orientation data indicating the second orientation of the image-capture device arranged on the sharer mobile device; and
    adjust the graphical image indicative of the requested orientation based on the further orientation data.

7. The system of claim 1, wherein the graphical image has at least one attribute, and wherein the system further comprises program instructions stored on the non-transitory computer readable medium and executable by at least one processor to cause the sharer mobile device to:
    modify the at least one attribute based on the second orientation.

8. The system of claim 7, wherein the at least one attribute comprises at least one of a size, a shape, a color, a brightness, a contrast, and a transparency.

9. The system of claim 1, wherein the system further comprises program instructions stored on the non-transitory computer readable medium and executable by at least one processor to cause the sharer mobile device to:
    provide an audible indication that the second orientation is not within a threshold from the requested orientation.

10. The system of claim 1, wherein the graphical image has at least one attribute, and wherein the system further comprises program instructions stored on the non-transitory computer readable medium and executable by at least one processor to cause the sharer mobile device to:
    modify the at least one attribute based on the second orientation.

11. A computer-implemented method comprising:
    receiving first video data, the first video data corresponding to a first orientation of an image-capture device that is arranged on a sharer mobile device;
    sending the first video data to a viewer mobile device;
    receiving, from the viewer mobile device, orientation data indicating a requested orientation of the image-capture device arranged on the sharer mobile device, wherein the requested orientation is based on movement data generated at the viewer mobile device in accordance with a movement of the viewer mobile device;
    causing a graphical image indicative of the requested orientation to be displayed on a graphical display of the sharer mobile device;
    receiving second video data, the second video data corresponding to a second orientation of the image-capture device arranged on the sharer mobile device;
    determining whether the second orientation is within a threshold from the requested orientation; and
    responsive to determining that the second orientation is within the threshold, sending the second video data to the viewer mobile device.

12. The method of claim 11, wherein sending the first video data comprises streaming the first video data, and wherein sending the second video data comprises streaming the second video data.

13. The method of claim 11, further comprising:
    responsive to determining that the second orientation is not within the threshold, providing an audible indication that the second orientation is not within a threshold from the requested orientation.

14. The method of claim 11, wherein the orientation data indicates one of (i) one rotation about one axis of a three-axis coordinate system, (ii) two rotations about two axes of a three-axis coordinate system, and (iii) three rotations about three axes of a three-axis coordinate system.

15. A system comprising:
a non-transitory computer readable medium; and
program instructions stored on the non-transitory computer readable medium and executable by at least one processor to cause a viewer mobile device to:
receive first video data from a sharer mobile device, the first video data corresponding to a first orientation of an image-capture device that is arranged on the sharer mobile device;
cause at least a first portion of the first video data to be displayed on a graphical display of the viewer mobile device;
receive orientation data indicating an orientation of the graphical display of the mobile device, wherein the orientation of the graphical display of the viewer mobile device corresponds to a requested orientation of the image-capture device arranged on the sharer mobile device, and wherein the requested orientation is based on movement data generated at the viewer mobile device in accordance with a movement of the viewer mobile device;
send the orientation data to the sharer mobile device, wherein the orientation data causes a graphical image indicative of the requested orientation to be displayed on a graphical display of the sharer mobile device;
receive second video data from the sharer mobile device, the second video data corresponding to a second orientation of the image-capture device arranged on the sharer mobile device, wherein the second orientation is within a threshold from the requested orientation; and
cause at least a portion of the second video data to be displayed on the graphical display of the viewer mobile device.

16. The system of claim 15, wherein the orientation data indicates one of (i) one rotation about one axis of a three-axis coordinate system, (ii) two rotations about two axes of a three-axis coordinate system, and (iii) three rotations about three axes of a three-axis coordinate system.

17. The system of claim 15, wherein the system further comprises program instructions stored on the non-transitory computer readable medium and executable by at least one processor to cause the viewer mobile device to:
after receiving orientation data indicating an orientation of the graphical display of the viewer mobile device, cause a second portion of the first video data to be displayed on the graphical display of the viewer mobile device based on the received orientation data.

18. The system of claim 15, wherein the second orientation of the image-capture device arranged on the sharer mobile device is not within a threshold of the requested orientation, and wherein the system further comprises program instructions stored on the non-transitory computer readable medium and executable by at least one processor to cause the viewer mobile device to:
cause a visual indication to be displayed on the graphical display of the viewer mobile device, wherein the visual indication indicates that the second orientation of the image-capture device arranged on the mobile device is not within the threshold of the requested orientation.

19. The system of claim 18, wherein causing at least a portion of the first and second video data, respectively, to be displayed on the graphical display of the viewer mobile device comprises causing the portion of the first and second video data, respectively, to be displayed within a given viewing region, and wherein the visual indication comprises a blank space within the given viewing region.

20. The system of claim 18, wherein the graphical display of the viewer mobile device has at least one display attribute, wherein the at least one attribute comprises at least one of a color, a brightness, a contrast, and a transparency, and wherein causing the visual indication comprises modifying the at least one display attribute of the graphical display of the viewer mobile device.

* * * * *